(12) United States Patent
Gregory et al.

(10) Patent No.: US 8,191,426 B2
(45) Date of Patent: Jun. 5, 2012

(54) LOW TCR NANOCOMPOSITE STRAIN GAGES

(75) Inventors: Otto J. Gregory, Wakefield, RI (US); Ximing Chen, Kingston, RI (US)

(73) Assignee: Board of Governors for Higher Education, State of Rhode Island and Providence Plantations, Providence, RI (US)

( * ) Notice: Subject to any disclaimer, the term of this patent is extended or adjusted under 35 U.S.C. 154(b) by 902 days.

(21) Appl. No.: 12/133,743

(22) Filed: Jun. 5, 2008

(65) Prior Publication Data

US 2009/0145235 A1 Jun. 11, 2009

Related U.S. Application Data

(60) Provisional application No. 60/942,017, filed on Jun. 5, 2007.

(51) Int. Cl.
*G01L 9/04* (2006.01)
(52) U.S. Cl. ....................................... 73/726
(58) Field of Classification Search ............ 73/726, 73/777
See application file for complete search history.

(56) References Cited

U.S. PATENT DOCUMENTS

| | | | |
|---|---|---|---|
| 5,627,637 A | 5/1997 | Kapteyn | |
| 5,861,558 A | 1/1999 | Buhl et al. | |
| 6,427,539 B1 | 8/2002 | Chen et al. | |
| 6,521,966 B1 | 2/2003 | Ishio et al. | |
| 6,729,187 B1 | 5/2004 | Gregory | |
| 7,963,171 B2* | 6/2011 | Gregory et al. | 73/777 |
| 2005/0115329 A1* | 6/2005 | Gregory et al. | 73/777 |

OTHER PUBLICATIONS

Dyer et al, "Preparation and piezoresistive properties of reactively sputtered indium tin oxide thin films", Thin Solid Films 288, 1996, pp. 279-286.
Gregory et al, "An apparent n to p transition in reactively sputtered indium-tin-oxide high temperature strain gages", Thin Solid Films 405, 2002, pp. 263-269.
Gregory et al, "High temperature stability of indium tin oxide thin films", Thin Solid Films 406, 2002, pp. 286-293.
Gregory et al, "A self-compensated ceramic strain gage for use at elevated temperatures", Sensors and Actuators A 88, 2001, pp. 234-240.
NASA Aerospace Propulsion and Power Program NRA-01-GRC-02 Ceramic Strain Gages for Use at Temperatres up to 1500C Annual Technical Report, Dec. 2001-Oct. 2002, pp. 1-25.
Cahill et al., "Thermometry and Thermal Transport in Micro-Nanoscale Solid-State Devices and Structures", Journal of Heat Transfer, Apr. 2002, vol. 124, pp. 223-241.
Cahill et al., "Nanoscale thermal transport", Journal of Applied Physics, Jan. 15, 2003, vol. 93, No. 2, pp. 793-818.
Gregory et al, "Piezoresistive Properties of ITO Strain Sensors Prepared with Controlled Nanoporosity", Journal of the Electrochemical Society, vol. 151, No. 8, 2004, pp. H198-H203.

(Continued)

*Primary Examiner* — Freddie Kirkland, III
(74) *Attorney, Agent, or Firm* — Gesmer Updegrove LLP

(57) ABSTRACT

A high temperature thin film strain gage sensor capable of functioning at temperatures above 1400° C. The sensor contains a substrate, a nanocomposite film comprised of an indium tin oxide alloy, zinc oxide doped with alumina or other oxide semiconductor and a refractory metal selected from the group consisting of Pt, Pd, Rh, Ni, W, Ir, NiCrAlY and NiCoCrAlY deposited onto the substrate to form an active strain element. The strain element being responsive to an applied force.

11 Claims, 6 Drawing Sheets

Combinatorial "strain gage" libraries

OTHER PUBLICATIONS

Gregory et al, "Piezoresistive Properties of Ceramic Strain Sensors with Controlled Nanporosity", Materials Research Society Proceedings 785 (489), 2003, 6 pages.

Gregory et al, "Stabilization of Indium Tin Oxide Films to Very High Temperatures", Ma. Res. Soc. Symp. Proc., vol. 751, 2003, pp. 109-114.

Gregory et al, "Stabilization of Ceramic Strain Gages to Temperatures beyond 1500C" Proceedings of the Instrumentation, Systems, and Automation Society, ISA vol. 443, No. 1, 2003, 12 pages.

Gregory et al, "Stability and Piezoresistive Properties of Indium-Tin-Oxide Ceramic Strain Gages", IEEE Sensor Proceedings, 801, 2003, 6 pages.

Gregory et al, "Piezoresistive Properties of Ceramic Strain Sensors with Controlled Nanporosity", PowerPoint presentation at MRS Fall 2003 meeting, Dec. 5, 2003.

Gregory et al, Ongoing Research "Ceramic Strain Sensors for Use at Temperatures up to 1500C", PowerPont presentation for Propulsion Instrumentation Working Group, Nov. 14, 2003.

Gregory et al, "Stability and Piezoresistive Properties of Ceramic Strain Gages", PowerPoint presentation at IEEE Sensors 2003, Oct. 24, 2003.

Costescu et al., "Ultra-Low Thermal Conductivity in W/Al2O3 Nanolaminates", Science, vol. 303, Feb. 13, 2004, 2 pages.

* cited by examiner

LOW TCR NANOCOMPOSITE STRAIN GAGES

PRIORITY INFORMATION

This application claims priority to U.S. Provisional Patent Application No. 60/942,017, filed on Jun. 5, 2007, all of which is incorporated herein in its entirety.

GOVERNMENT SPONSORSHIP

This invention was made with government support under Grant No. NNCO5GA67G awarded by the National Aeronautic and Space Administration (NASA). The government has certain rights in the invention.

BACKGROUND OF THE INVENTION

Ceramic strain gages are being developed to monitor the structural integrity of gas turbine engine components employed in aerospace propulsion and power generation systems. The hot sections of these engines are exposed to gas temperatures in excess of 1500° C. Temperature gradients from the turbine blade tip to the root of the blade can be as large as 450° C. Thus, strain measurement under these conditions using resistance strain gages can lead to considerable error due to apparent strain effects, including thermal expansion coefficient mismatch between the gage and substrate as well as the temperature coefficient of resistance or TCR. Therefore, apparent strain effects are particularly troublesome when the active strain gage elements have an inherently large temperature coefficient of resistance. Apparent strain effects in resistance strain gages can be mitigated by employing strain gages that have a similar thermal expansion to the substrate and a smaller temperature coefficient of resistance, but the choices are much more limited when going to higher temperatures, since the piezoreisistive response and chemical and electrical stability become more important under these conditions. However, given that the materials comprising high temperature strain gage element such as indium tin oxide (ITO), have an inherently large temperature coefficient of resistance (See FIG. 1), the choices for temperature compensation are limited to placing reisistors or other gage elements in series with the active strain element as taught by O. J. Gregory and Q. Luo. Sensors and Actuators A; Physical Sensors, vol. 88, pp. 234-240 (2001), since most metals typically exhibit positive TCR's while most semiconductors exhibit negative TCR's, or using signal conditioning protocols that subtract out the contribution of thermal strain from the total strain to yield the mechanical strain; i.e. if the TCR is well characterized, this portion of the signal can be subtracted from total signal to give an approximate measurement due to mechanical loading.

SUMMARY OF THE INVENTION

A high temperature thin film strain gage sensor capable of functioning at temperatures above 1200° C. The sensor includes a substrate, a nanocomposite film comprised of indium tin oxide alloy, zinc oxide doped with alumina or other oxide semiconductor and a refractory metal such as Pt, Pd, Rh, Ni, W, Ir, NiCrAlY and NiCoCrAlY deposited onto the substrate to form an active strain element. The strain element is responsive to an applied force.

The ITO alloy comprises about 90% weight $In_2O_3$ and about 10% weight $SnO_2$ wherein the weights being based on the total weight of the ITO alloy.

These and other features and objectives of the present invention will now be described in greater detail with reference to the accompanying drawings, wherein:

DESCRIPTION OF THE INVENTION

Figure 2:
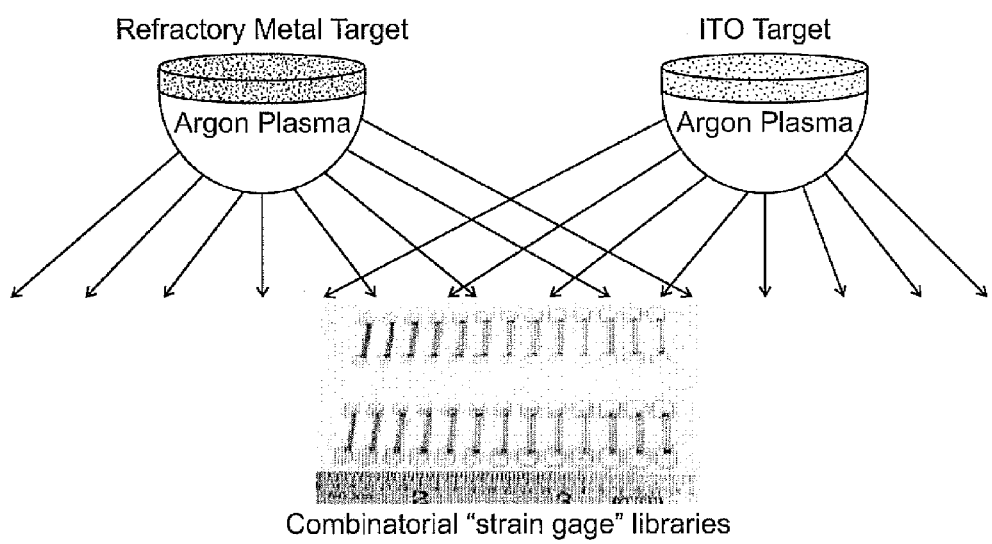
FIG. 2 is a graphic showing an ITO/Pt combinatorial "strain gage" libraries prepared by co-sputtering onto alumina substrates placed in between ITO and Pt or other refractory metal sputtering targets.
Figure 3:
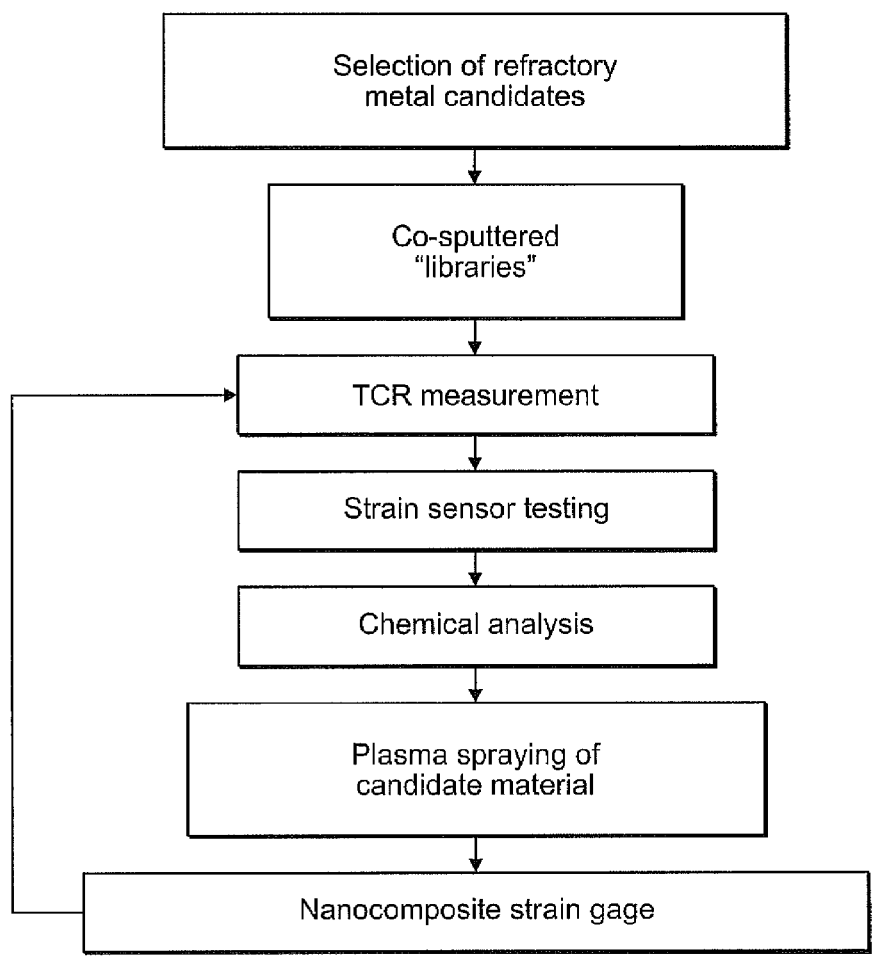
FIG. 3 is a graphic protocol used for rapid screening of low TCR strain gage libraries developed from combinatorial materials synthesis.

By combining refractory metals and oxide semiconductors in a single strain gage element (refractory metals that exhibit a positive TCR and semiconductors that exhibit a negative TCR) a TCR approaching zero over an extended temperature range of interest would be feasible. Ceramic thin film strain gages based on indium-tin-oxide (ITO) and refractory metal (Pt, Pd, Rh, Ni, W, Ir and NiCoCrAlY) nanocomposites were prepared in an attempt to form composites with a very low TRC in a single strain element without compromising the piezoreisitive response of the strain gage. Nanocomposite sensor elements comprised of a large number of ITO/Pt combinatorial libraries were prepared by reactive co-sputtering onto alumina substrates placed in between ITO and Pt or other refractory metal sputtering targets as shown in FIG. 2. TCR measurements of the nanocomposite sensors were made by thermally cycling the strain gages from room temperature to 1000° C. and the piezoresistive response was measured at strain levels up to 1000µ$\epsilon$ from room temperature to 1200° C. There are no standards for strain gages operating over 900 C even though there are ASTM standards for strain gage calibration and application to components in general, these are usually restricted to room temperature or slightly above room temperature. The chemical composition of the most promising combinatorial sensor libraries was analyzed by EDS/SEM. The protocol used for rapid screening of the low TCR strain gage libraries developed from combinatorial materials synthesis is shown in FIG. 3.

Preliminary results indicate that a near zero TCR could be achieved for a non optimized nanocomposite strain gage containing less than 10% ITO. Even though EDS revealed that the bulk of the nanocomposite strain sensor was platinum, the gage factor remained relatively large (~26.0) and exhibited a very low drift rate (0.018%/hr). Based on these results, other combinatorial libraries employing ITO/refractory metal nanocomposites including ITO/Pd, ITO/Ni, ITO/NiCoCrAlY, ITO/W and ITO/Ir were considered for high temperature strain gage applications. The TCR's of thin film refractory metals and corresponding ITO/metal nanocomposites based on these thin films are summarized in Table 3.

Figure 1:
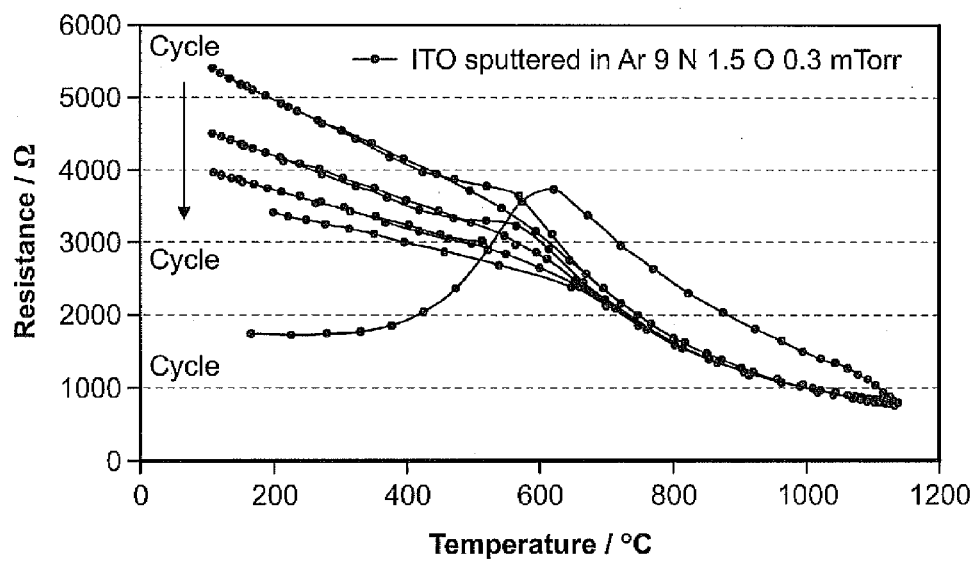
FIG. 1 is a graph of the temperature coefficient of resistance of an indium tin oxide strain gage as a function of thermal cycling.

Ceramic strain gages based on reactively sputtered indium tin oxide (ITO) have been considered for a number of applications where strain measurements are required at elevated temperature since they exhibit excellent oxidation resistance and high temperature electrical stability. Dynamic strain gages based on indium tin oxide have been demonstrated at temperatures in excess of 1200° C. However, static strain measurements have been limited by large apparent strain effects due to the large, negative temperature coefficient of resistance (TCR) that is associated with ITO (See FIG. 1). Large TCR's typically require the implementation of elaborate temperature compensation schemes into the measurement protocols. The large apparent strain effects associated with ITO can be mitigated by adding compensating sensor materials to cancel these large apparent strain effects in a single low TCR composite material. Since refractory metals typically exhibit a large positive TCR and semiconductors exhibit a large negative TCR, the combination of these in a single material at very small length scales could produce sensor elements with minimal apparent strain. The nanocomposite thin film strain gages based on ITO and refractory metals were prepared in such a way that the strain gage elements were compensated at very small length scales. The large surface area to volume ratio along with the optimal phase distribution can produce metallic phases with dimensions smaller than the mean free path for electron scattering and thus, electron scattering will occur largely at grain boundaries. As a result, the electrical resistivity and TCR will be greatly affected by the distribution of phases in the nanocomposite, since electrical conduction in ITO is also governed by grain boundary transport as well. Nanocomposite strain elements comprised of ITO/(Pt, Pd, W, NiCoCrAlY, Ni and Ir) combinatorial libraries were prepared by co-sputtering from ITO and refractory metal targets to reduce the TCR over the temperature range of interest (500-1100° C.).

Static strain measurement using resistance strain gages is difficult because resistance is not only a function of strain, but also functions of temperature and time, i.e., $R=R(\epsilon, T, t)$. To a first approximation, the relative change in resistance of a strain gage is:

$$\frac{\Delta R}{R} = \frac{1}{R} \cdot \frac{\partial R}{\partial \varepsilon}\bigg|_{T,t} \cdot \Delta \varepsilon + \frac{1}{R} \cdot \frac{\partial R}{\partial T}\bigg|_{\varepsilon,t} \cdot \Delta T + \frac{1}{R} \cdot \frac{\partial R}{\partial t}\bigg|_{\varepsilon,T} \cdot \Delta t \quad (1)$$

where the first term, gage factor, is a measure of the piezoresistive response or sensitivity of the gage. The second term is a measure of the 'apparent strain' and is due to the thermal expansion mismatch between the gage and substrate and the temperature coefficient of resistance of the gage material. The third term in equation (1), drift rate (DR), reflects the electrical stability. These three factors represent the performance metrics of a strain gage and can be individually calculated by the equations below:

$$G = \frac{\Delta R}{R} \cdot \frac{1}{\Delta \varepsilon} \quad (2)$$

$$TCR = \frac{\Delta R}{R} \cdot \frac{1}{\Delta T} \quad (3)$$

$$DR = \frac{\Delta R}{R} \cdot \frac{1}{\Delta t} \quad (4)$$

where R is the initial resistance, $\Delta R$ is the change in resistance, $\Delta t$ is the applied strain, $\Delta T$ is the change in temperature and $\Delta t$ is the length of time.

To measure the resistance change due to the mechanical strain alone, the effects that cause the resistance to change with temperature have to be eliminated. In previous work, a self-compensated strain gage was fabricated using thin film platinum resistors placed in series with an active ITO strain element and a near zero TCR was achieved by this method from room temperature to 1400° C. In present work, low TCR nanocomposite strain gages were fabricated by co-sputtering ITO and platinum. Hence the ITO phase with a characteristic size on the order of nanometers was embedded in a metal matrix using non-equilibrium physical vapor deposition processes.

Figure 4:
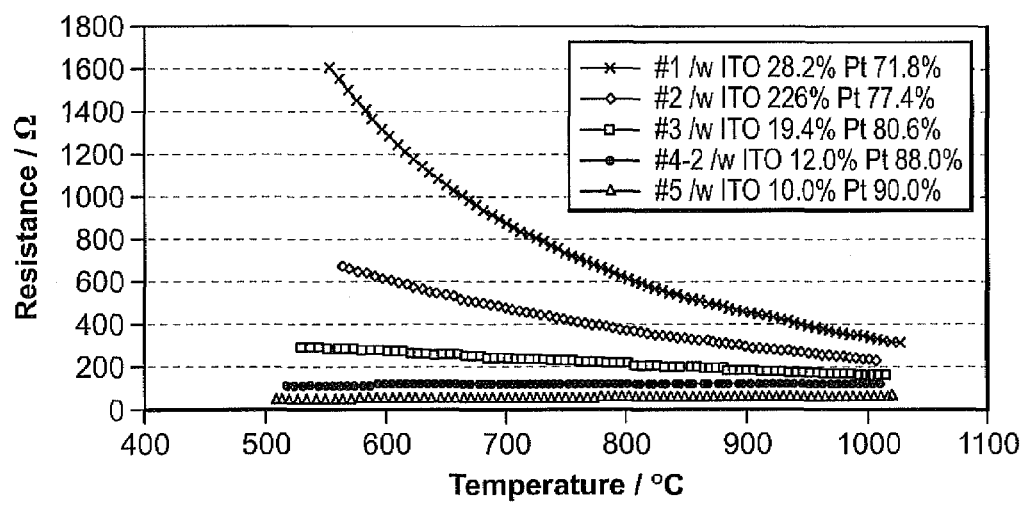
FIG. 4 is a graph of electrical resistance of several ITO-Pt nanocomposite libraries as a function of temperature.

Nanocomposites comprised of ITO-Ni, ITO-Pd, ITO-Pt, ITO-NiCoCrAlY, ITO-W and ITO-Ir were evaluated and ITO-Pt was the most promising combination investigated. The TCR's for several ITO-Pt combinations are shown in FIG. 4. Here, the samples were identified according to their positions relative to the two sputtering targets, e.g., the larger the number, the closer the particular library was to the platinum target and further from the ITO target. Libraries located closer to the ITO target resulted in an ITO-rich nanocomposite and since ITO has a large negative TCR, the nanocomposite reflected a negative TCR (See #1 trace in FIG. 4). The libraries further away from the ITO target showed a dramatic decrease in TCR (See #2-#5 trace in FIG. 4). However, when the libraries were too close to the platinum target, platinum dominated the electrical behavior and the sensor became over-compensated. Since platinum has a large positive TCR, the overall TCR of the sensor became positive (See #4-2 and #5 trace in FIG. 4). A minimum in TCR was observed for ITO-Pt combination between #5 and #4-2, which exhibited small negative and positive TCR's (−79 and +50 ppm/° C. respectively).

To determine the chemistry of the sensors, EDS analysis of the most promising combinations was performed. Chemical analysis and TCR of a number of ITO-Pt sensor combinations are listed in Table I. The absolute value of TCR decreased dramatically with decreasing ITO content, and then increased again when platinum content of the sensors dominated the electrical properties. The results also indicated an optimal nanocomposite sensor was combined with 88 wt % platinum and 12 wt % ITO wherein a very low TCR (+50 ppm/° C.) strain gage could be produced with these percentages of materials or a 50 vol % ITO and 50 vol % Pt.

TABLE 1

Chemical analysis and TCR of the nanocomposite sensors.

| | Sample ID | | | | | |
|---|---|---|---|---|---|---|
| | #1 | #2 | #3 | #4-1 | #4-2 | #5 |
| ITO wt % | 28.2 | 22.6 | 19.4 | 11.2 | 12.0 | 10.0 |
| TCR (ppm/° C.) calculated* | −2538 | −1980 | −1119 | −247 | −315 | −155 |

TABLE 1-continued

Chemical analysis and TCR of the nanocomposite sensors.

| | Sample ID | | | | | |
|---|---|---|---|---|---|---|
| | #1 | #2 | #3 | #4-1 | #4-2 | #5 |
| TCR (ppm/° C.) measured | −1755 | −1475 | −710 | −79 | +50 | +188 |

Values were based on the model presented in O. A. Vasilenko, A. A. Maier, V. A. Chashchin, E. N. Gulaeva and V. I. Busko. J. Engineering Physics, vol. 49, issue 3, pp. 1105-1108, (1985).

Since some refractory metals exhibit larger, positive TCR's than platinum (Table 2), other refractory metals were combined with semiconductors such as ITO in a single material at very small length scales to minimize apparent strain. Since less material would be required in the composite to cancel the effects of the large negative TCR of the oxide semiconductor, nanocomposite thin film strain gages based on ITO and other refractory metals were prepared to exploit the larger TCR's of the refractory metals in an attempt to maximize the piezoresistive response. However, these non-optimized refractory metal combinations were more prone to oxidation and yielded less reproducible electrical properties including TCR relative to platinum (Table 2).

TABLE 2

TCR's of thin film refractory metals and corresponding ITO/metal nanocomposites based on these refractory metal thin films

| Thin film material | TCR (ppm/° C.) | Temperature range (° C.) | ITO-metal nanocomposite |
|---|---|---|---|
| ITO | −1800 | <1500 | |
| Platinum | +1525 | <1400 | near zero TCR @ 500-1200° C. |
| Palladium | +1667 | <1200 | hysteresis found at 800° C., not linear |
| Nickel | +2225 | <700 | oxidation at 700° C., not stable |
| NiCoCrAlY | +1600 | <820 | 300 ppm/° C. @ 100-800° C., TCR can be further reduced |
| Iridium | +2280 | <880 | not measured |
| Tungsten | +1825 | <550 | not stable at above 550° C. |

Film thickness is approximately 1.5 µm

Figure 5:
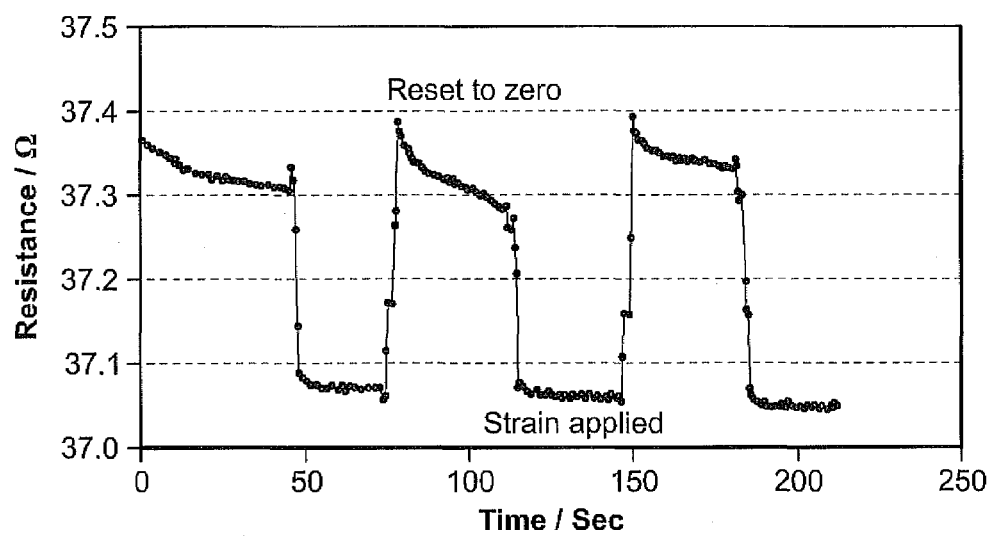
FIG. 5 is a graph of piezoresistive response of an ITO-Pt nanocomposite strain gage at 800° C. ($\epsilon$=256µ$\epsilon$, G=26.0)
Figure 6:
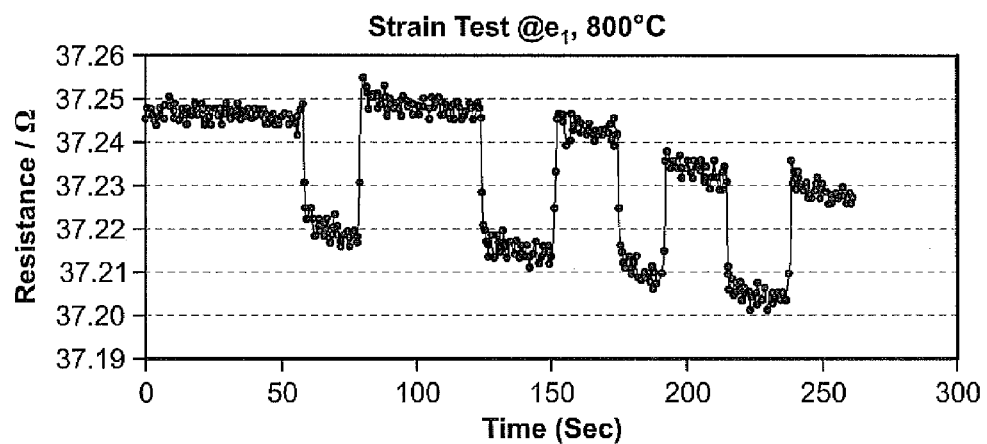
FIG. 6 is a graph of piezoresistive response of an ITO-Pt nanocomposite strain gage at 800° C., =50 µm/m, G=17.

Based on the above observations, the platinum dominated strain sensors yielded relatively low TCR's. However, it was anticipated that the platinum contribution to the overall TCR of the nanocomposite may partially cancel the relatively large piezoresistive response associated with ITO. If the contribution of the platinum to the overall piezoresistive response merely followed an additive mixing rule, a reduced gage factor might be anticipated. Therefore, the piezoresistive response of the ITO-Pt nanocomposite strain sensors with low TCR's were evaluated. FIGS. 5 and 6 show the piezoresistive response of an ITO-Pt nanocomposite sensor at 800° C. for an applied strains of 256 and 50µε, respectively. Unexpectedly large gage factors were observed for this combination of ITO and platinum (26.0 and 17) respectively.

Figure 7:
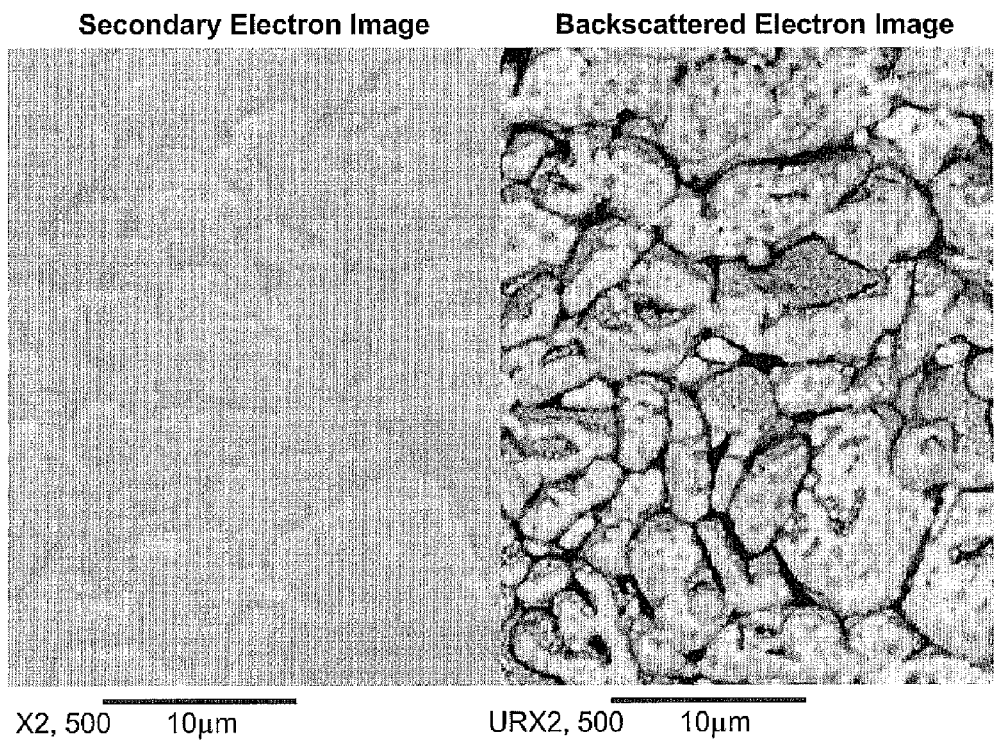
FIG. 7 is a SEM micrograph of an ITO-Pt nanocomposite strain gage with nominal composition of 88% Pt and 12% ITO.
Figure 8:
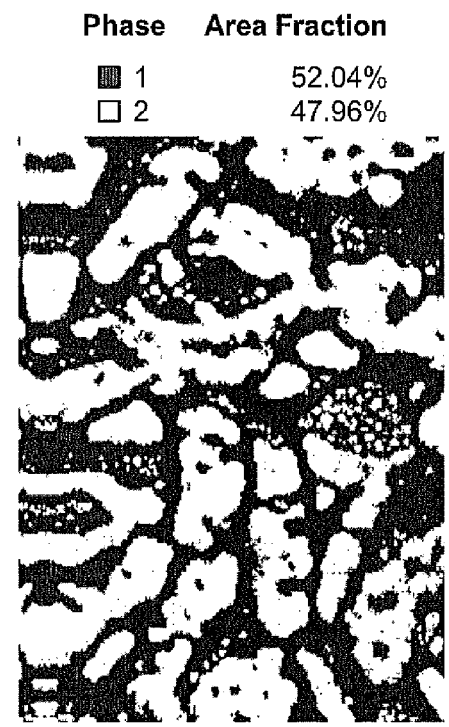
FIG. 8 is an area fraction of ITO and Pt in the nanocomposite.

SEM analysis of an ITO-Pt nanocomposite showing the differences between a secondary electron and backscattered electron imaging is shown in FIG. 7. The SEI micrograph shows the surface topography of the nanocomposite sensor while the BEI provides more details about particle size and phase distributions in the composite, where the light phase is platinum and the dark phase is ITO. From these micrographs the ITO-Pt particle within the composite had a mean particle size of 200 nm and the volume fraction (area fraction) of the light phase and dark phase were approximately the same in the optimized composite. These micrographs may explain in part why platinum did not have much influence on the gage factor. The platinum appears to encapsulate the ITO particles, i.e., the platinum formed a layer around the ITO particle (partially wetting the particles), contributing largely to the surface conductivity of ITO. Thus the volume contribution of platinum was less in the nanocomposite and the piezoresistive response, which is a bulk phenomenon (volume property), was considerably less. Combinatorial chemistry was used as the rapid screening technique to determine the optimal ratio of refractory metal and ITO phases to form low TCR thin film strain gages. The results showed that a very low TCR (+50 ppm/° C.) strain gage could be produced with a nanocomposite having a nominal composition of 12 wt % ITO and 88 wt % Pt or 50 vol % ITO:50 vol % Pt based on FIG. 8. Piezoresistive response and electrical stability measurements of other ITO-Pt nanocomposite strain gages libraries still exhibited relatively large gage factors even though sufficient metal was added to dramatically reduce TCR. SEM analysis of the ITO-Pt nanocomposites showed that the particle size was about 200 nm and the volume fraction of ITO in the optimal library approached 50% (See FIG. 8), which is consistent with fact that the metal and oxide had a TCR of similar magnitude but opposite sign.

Figure 9:
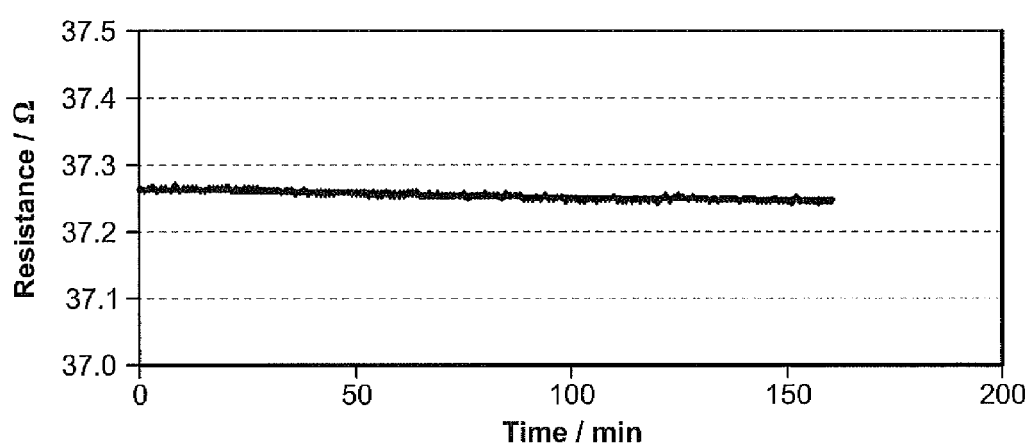
FIG. 9 is a graph of drift rate of an ITO-Pt nanocomposite strain gage at 800° C.
Figure 10:
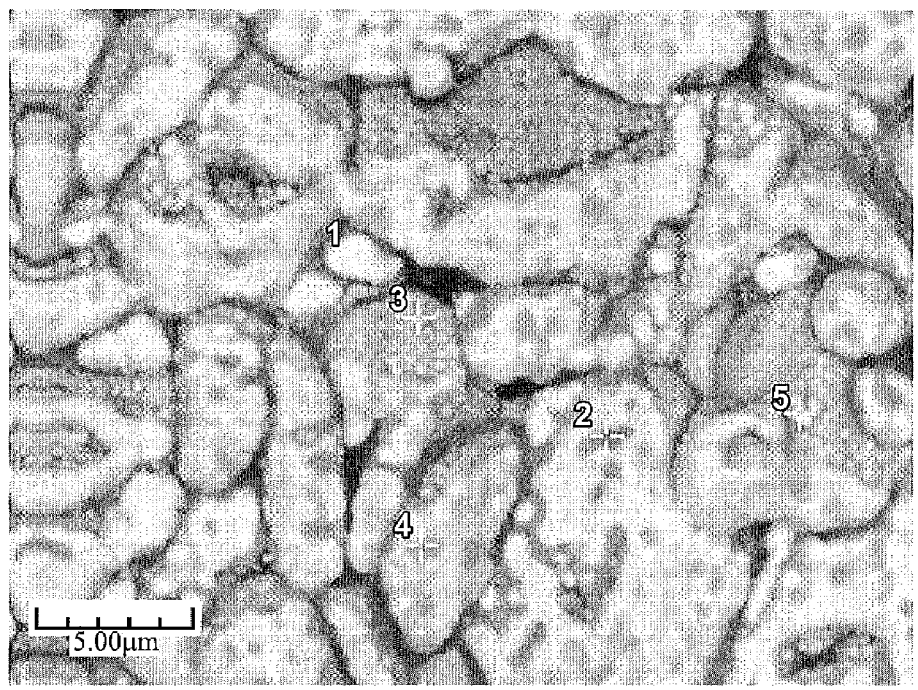
FIG. 10 is a SEM micrograph of an ITO-Pt sensor (#4-2)
Figure 11:
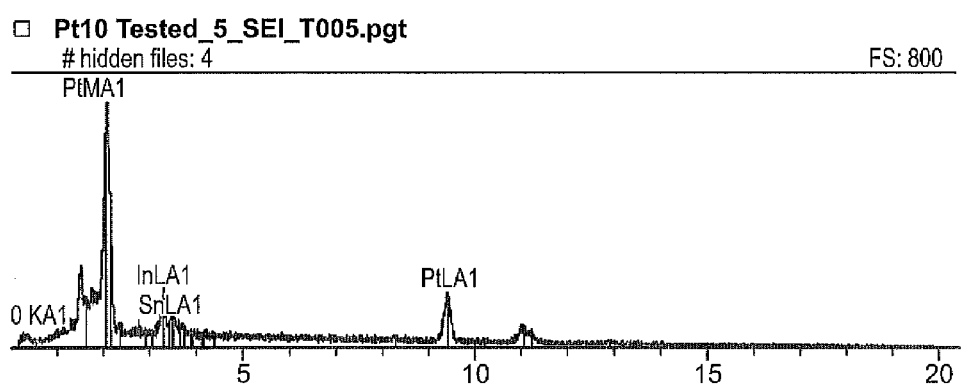
FIG. 11 is an EDS spectrum of an ITO-Pt sensor (#4-2).

Not only was the gage factor unexpectedly large (26.0), the strain gage exhibited good electrical stability, having a drift rate of only 0.018%/hr at 800° C. (See FIG. 9). To further characterize the sensors, EDS analysis of the most promising combinations was done to determine the chemistry of the sensors. FIGS. 10 and 11 show an SEM micrograph and an EDS spectra of ITO-Pt 10. A detailed chemical analysis for the optimized ITO-Pt low TCR strain gage is listed in table 3. The results also indicated that a nanocomposite sensor with the lowest TCR was achieved with 10 wt % ITO and 90 wt % platinum.

TABLE 3

Chemical composition of elements in the nanocomposite sensor

| Element | Line | keV | KRatio | Wt % | At % | At Prop | ChiSquared |
|---|---|---|---|---|---|---|---|
| O | KA1 | 0.523 | 0.0000 | 0.00 | 0.00 | 0.0 | 1.01 |
| Pt | LA1 | 9.442 | 0.2019 | 87.07 | 79.89 | 0.0 | 0.68 |
| In | LA1 | 3.286 | 0.0210 | 12.02 | 18.74 | 0.0 | 0.66 |
| Sn | LA1 | 3.443 | 0.0016 | 0.91 | 1.37 | 0.0 | 0.33 |
| Total | | | 0.2244 | 100.00 | 100.00 | 0.0 | 2.29 |

Thus one could manufacture a thin film strain gage from a nanocomposite having a nominal composition in the range of 0.5 to 10.0 wt % ITO and 88 wt % PT with preferred ranges being 12 wt % ITO and 88 wt % Pt or a 60 to 40 vol % ITO and a 40 to 60 vol % Pt, with preferred ranges being 50 vol % ITO to 50 vol % Pt. The nanocomposite is deposited onto a substrate of substrate aluminum oxide or an aluminum oxide coated superalloy substrate, an aluminum oxide coated refractory metal substrate, an aluminum oxide coated stainless steel substrate or a thin monolithic ceramic substrate that is capable of being flexed. The nanocomposite can be in the range of 1 to 200 µm thick, with a preferable thickness in the range of 0.1 um to 20 um thick.

In terms of ranges composition for said ITO alloys, ITO comprises about 80-97% weight $In_2O_3$ and about 20-3% weight $SnO_2$ wherein the weights being based on the total weight of the ITO alloy. In terms of the alloys based on zinc oxide doped with alumina or AZO, these alloys comprise about 98% weight ZnO and about 2% weight alumina wherein the weights being based on the total weight of the AZO alloy.

The substrate of the thin film strain gage sensor may also comprise a thin metal, ceramic or composite substrate or flexible diaphragm containing one or more transducers to measure deflection of the flexible diaphragm. Such a flexible diaphragm prepared with one or more transducers could be used to measure deflection and thus, be correlated with pressure or force and be used as the active element in pressure sensors.

One can not purchase a pressure sensor which functions at temperatures above 450° C. as silicon or silicon carbide based electronics can not operate above 450° C. However by using self compensation attributes of the low TCR nanocomposite strain gages described within this invention to manufacture the active strain gage elements in such a pressure sensor, the pressure sensor will be able to function at temperatures well above 450° C. if the components comprising the body and diaphragm of the pressure transducer are made from refractory materials, a pressure sensor capable of operating at temperatures above 1400° C. is possible. The reason for the need of a low TCR nanocomposite strain gage in said applications is that temperature compensation in these types of pressure transducers is normally done using on board electronic compensation techniques, since the strain gage elements have too high a TCR for stable calibration and reproducibility of displacement of the diaphragm with pressure in the pressure transducer. In pressure sensor applications, the chemistry of the nanocomposite can be tweaked to yield the desired on board strain gage characteristics in terms of apparent strain effects.

A pressure sensor capable of functioning at temperatures above 450° C. can be manufactured. The pressure sensor comprises a thin metal, ceramic or composite flexible diaphragm which is electrically isolated from one or more thin film strain gages placed on the surface usually in a Wheatstone bridge configuration to measure small deflections of the flexible diaphragm. Based on these resistance changes, which are correlated with pressure or force, the pressure transducer is calibrated for a range of pressures. The low TCR nanocomposites (based on ITO and refractory metal) can be used as the active strain elements in the pressure sensors. The flexible diaphragm is typically welded or screwed into the housing (transducer body) which consists of a tube (or hollow cylinder) such that the strain gages deposited on the flexible diaphragm are facing the tube or housing, such that they never actually see the gas stream directly. As the temperature of the gas stream changes so does the characteristic of the pressure sensor and thus, temperature compensation is critical for the calibration and stability of the pressure sensor output.

Nanocomposite sensor elements were prepared from ITO/refractory metal combinatorial libraries by co-sputtering onto alumina-based substrates placed in between ITO and refractory metal sputtering targets. Once characterized in terms of their electrical properties (TCR) and piezoresistive properties, the libraries were chemically analyzed to determine the chemistry of the best performing libraries. Powders of the same chemistry were then prepared and fed to a thermal spray gun (plasma spray gun) to produce sputtering targets of near optimum chemistry of the ITO and refractory metal. The idea being that the entire sputtering target or source material will have the desired (optimum) chemistry for a particular TCR so the TCR can be tweaked for a given application just by fabricating the plasma sprayed target to the desired specification in terms of chemistry. In this way the sputtering target or source material becomes a claim and the method of producing the sputtering target with the desired chemistry. With this target material, it could be loaded into any sputtering machine and would produce nanocomposite films having the desired characteristics in terms of electrical properties (TCR) and piezoresistive properties, for every sputtering run; i.e. you could "hit" the desired material (chemistry and properties) every time you did a sputtering run. The target materials could be sold to people interested in forming nanocomposite films. The films can be used to form high temperature strain gages. Also high temperature pressure sensors could be made from the strain gages.

The foregoing description has been limited to a specific embodiment of the invention. It will be apparent; however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A high temperature thin film strain gage sensor capable of functioning at temperatures above 1400° C., said sensor comprising:
   a substrate,
   a nanocomposite film comprised of an indium tin oxide alloy, zinc oxide doped with alumina or other oxide semiconductor and a refractory metal selected from NiCrAlY and NiCoCrAlY deposited onto said substrate to form an active strain element, said strain element being responsive to an applied force.

2. The thin film strain gage sensor of claim 1, wherein said ITO alloy comprises about 80-97% weight $In_2O_3$ and about 20-3% weight $SnO_2$ wherein the weights being based on the total weight of the ITO alloy.

3. The thin film strain gage sensor of claim 1, wherein said ITO alloy comprises about 90% weight $In_2O_3$ and about 10% weight $SnO_2$ wherein the weights being based on the total weight of the ITO alloy.

4. The thin film strain gage sensor of claim 1, wherein alloys based on zinc oxide doped with alumina or AZO, comprise about 98% weight ZnO and about 2% weight alumina wherein the weights being based on the total weight of the AZO alloy.

5. The thin film strain gage of claim 1 wherein the refractory metal comprises NiCrAlY.

6. The strain gage sensor of claim 1, wherein said substrate comprises aluminum oxide or an aluminum oxide coated superalloy substrate, an aluminum oxide coated refractory metal substrate, an aluminum oxide coated or silicon dioxide coated stainless steel substrate or other aluminum oxide coated MCrAlY substrates where M=Ni, Fe, Co or thin monolithic ceramic substrates based on alumina or silicon carbide or composites based on these ceramics which are capable of being flexed under moderate pressures.

7. The strain gage sensor of claim 1, wherein said nanocomposite film is approximately 4 um thick.

8. The strain gage sensor of claim 1, wherein said nanocomposite comprises the refractory metals NiCoCrAlY and said oxide semiconductors includes ITO.

9. The strain gage sensor of claim 6, which further comprises a thin metal, ceramic or composite substrate or flexible diaphragm containing one or more transducers to measure deflection of the flexible diaphragm.

10. The strain gage sensor of claim 1 having a TCR in a range of +30 ppm/° C. to −30 ppm/° C. over a temperature range 25'C-1400° C.

11. A pressure sensor capable of functioning at temperatures above 450° C., said pressure sensor comprising:

a housing having a surface,
one or more thin film strain gages, each comprising ITO/NiCoCrAlY,
a thin metal, ceramic or composite flexible diaphragm which is electrically isolated from the one or more thin film strain gages placed on the surface in a Wheatstone bridge configuration to measure small deflections of the flexible diaphragm.

* * * * *